(12) United States Patent
Mamigonians

(10) Patent No.: US 10,753,898 B2
(45) Date of Patent: Aug. 25, 2020

(54) SCANNING SHOES WITH AN EXTERNAL ELECTRIC FIELD

(71) Applicant: Zedsen Limited, London (GB)

(72) Inventor: Hrand Mami Mamigonians, London (GB)

(73) Assignee: Zedsen Limited, London (GB)

( * ) Notice: Subject to any disclaimer, the term of this patent is extended or adjusted under 35 U.S.C. 154(b) by 88 days.

(21) Appl. No.: 16/124,557

(22) Filed: Sep. 7, 2018

(65) Prior Publication Data

US 2019/0086352 A1   Mar. 21, 2019

(30) Foreign Application Priority Data

Sep. 16, 2017   (GB) .................................. 1714966.7

(51) Int. Cl.
  *G01N 27/22*   (2006.01)
(52) U.S. Cl.
  CPC .................................. *G01N 27/221* (2013.01)
(58) Field of Classification Search
  None
  See application file for complete search history.

(56) References Cited

U.S. PATENT DOCUMENTS

2008/0036592 A1* 2/2008 Barral .................... G01V 3/088
                                                              340/540
2017/0343666 A1  11/2017 Manneschi

FOREIGN PATENT DOCUMENTS

EP   1944624 A1   7/2008
EP   2392988 A2   12/2011

OTHER PUBLICATIONS

Corresponding Great Britain Search Report, Application No. 1714966.7, dated Mar. 13, 2018, 1 page.

* cited by examiner

*Primary Examiner* — Jas A Sanghera
(74) *Attorney, Agent, or Firm* — Cooper Legal Group LLC

(57) ABSTRACT

The scanning of shoes using an external electric field is shown. A shoe, while being worn, is positioned upon a support platform. At least one input line is strobed by the application of an input voltage having a first intensity and output lines are sampled to produce output samples. Selected output samples are compared against a reference and the input voltage is adjusted, in a response to this comparing step, from the first intensity to a second-intensity.

20 Claims, 12 Drawing Sheets

SCANNING SHOES WITH AN EXTERNAL ELECTRIC FIELD

CROSS REFERENCE TO RELATED APPLICATIONS

This application claims priority from United Kingdom Patent Application number 1714966.7, filed on Sep. 16, 2017, the whole contents of which are incorporated herein by reference.

BACKGROUND OF THE INVENTION

The present invention relates to scanning an object with an external electric field, in which at least one transmission line is energised by the application of an input voltage. The present invention also relates to an apparatus for scanning an object.

It is known to provide a sensor that includes a dielectric layer that presents a surface defining the base of a volume in which a test object may be placed in order to sense the electrical permittivity of an object, as described in U.S. Pat. No. 8,994,383 assigned to the present applicant. Signals are applied to a first electrode to produce an electric field that extends outside the sensor. An output signal is then produced in a second electrode by capacitive coupling, from which the electrical permittivity of the volume may be deduced.

In a security environment, dangerous items contained within packages or even items of clothing, such as shoes, may be detected from measurements of permittivity. A dangerous material could be included in the heel of a shoe for example. However, given that shoes come in many shapes and sizes, problems arise in terms of ensuring that the generated electric field penetrates sufficiently into an area of interest.

BRIEF SUMMARY OF THE INVENTION

According to a first aspect of the present invention, there is provided a method of scanning shoes with an external electric field, comprising the steps of: positioning a shoe while being worn, upon a support platform; strobing at least one input-line by the application of an input voltage having a first-intensity; sampling a plurality of output lines to produce a plurality of output samples; comparing selected output samples against a reference; and adjusting said input voltage in a response to said comparing step from said first-intensity to a second-intensity.

In an embodiment, the output samples represent properties in a two-dimensional array. The output samples may be shown in a three-dimensional representation. Output data may be selected based on an average value of the array. The reference may represent a mid-intensity-value and the adjusting step may adjust the input voltage to place the average values substantially at a mid-intensity-value. A rate of change may be calculated between output samples. An alarm may then be raised based on an outcome of this calculating step.

According to a second aspect of the present invention, there is provided an apparatus for scanning shoes, comprising: a support-platform for supporting a person wearing at least one shoe, such that said shoe is in contact with said support-platform; a dielectric-membrane in proximity to said support-platform, including at least one input-line and a plurality of output lines; a strobing-circuit for applying input voltages to said input-line; a sampling circuit for receiving output voltages from said output lines; a processor for comparing selected output signals against a reference to produce voltage-control-data; and a voltage-adjustment-circuit for adjusting said input voltage from a first-intensity to a second-intensity in response to said voltage-control-data.

In an embodiment, the voltage-adjustment-circuit includes a comparator for comparing said voltage-control-data against a voltage-reference.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

BRIEF DESCRIPTION OF THE SEVERAL VIEWS OF THE DRAWING

FIG. 1

Figure 1:
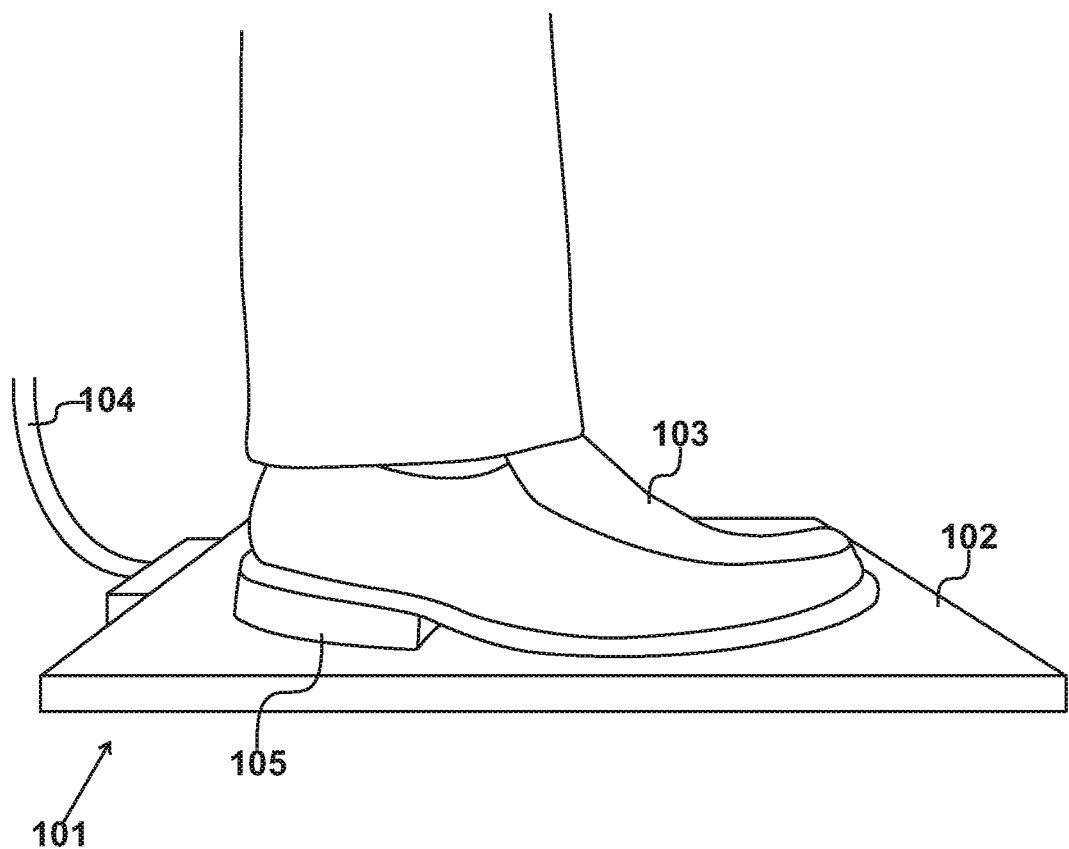
FIG. 1 shows an apparatus for scanning shoes.

An apparatus 101 for scanning shoes is illustrated in FIG. 1. The apparatus includes a support platform 102 for supporting a person wearing at least one shoe 103, such that the shoe 103 is in contact with the support platform 102. The shoe-scanning apparatus 101 includes a dielectric membrane in proximity to the support platform, that includes at least one input line and a plurality of output lines. A strobing circuit applies input voltages to the input lines and a sampling circuit receives output voltages from the output lines. A processor is provided for comparing selected output signals against a reference to produce voltage-control data. A voltage-adjustment circuit is provided for adjusting the input voltage from a first intensity to a second intensity in response to the voltage-control data. Thus, upon a shoe 103 being placed upon the support platform 102, the apparatus is energised to SUPPLY output voltages to the sampling circuit. These output voltages are analysed in order to produce output data on an output-data line 104, for subsequent processing that may involve producing visual displays and may involve the automatic generation of an alarm signal.

The purpose of the apparatus is to scan shoes to identify concealed substances, possibly present within the heel of a shoe, such as shoe heel 105. It is appreciated that many different types of shoe will be presented to the scanner, such that difficulties may be encountered in terms of assessing an appropriate strobe voltage. For each particular shoe, if a strobe voltage is too low, any irregularities in the data will be lost in the background noise. Alternatively, if a strobing voltage is too high, the resulting input signal will also be too high and the scanning procedure will not be able to distinguish different components within the heel of the shoe. Thus, when adopting a conventional approach, compromises must be taken in terms of selecting an appropriate strobing voltage. However, under these circumstances, some shoes will require a higher voltage and some may require a lower voltage. Consequently, the accuracy of the device is somewhat undermined and suspect concealments may be allowed to pass-through.

The present invention overcomes these difficulties by automatically adjusting the input strobing voltage in response to an analysis of the resulting scanned voltages. In particular, after performing a first scanning operation, input voltages are adjusted from a first intensity to a second intensity. Such a procedure is repeated while a shoe 103 remains in contact with the support platform 102. Typically, it may be possible to perform fifty iterations while a shoe remains in contact for a period of two seconds. In this way, strobing voltages may be optimised, thereby significantly enhancing an ability to identify suspect concealments from an analysis of the output data generated from the scanned voltages.

FIG. 2

Figure 2:
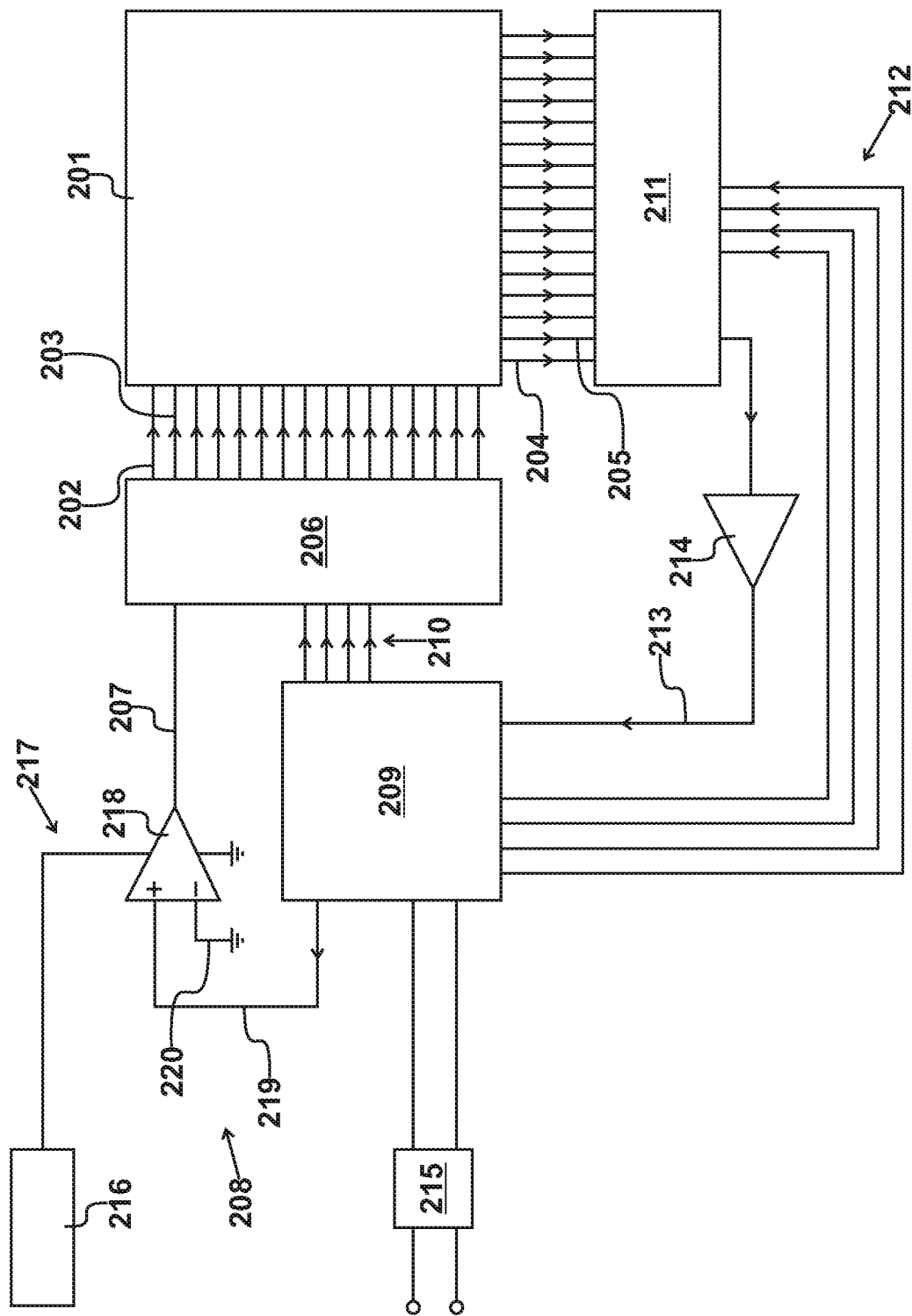
FIG. 2 shows a schematic representation of the shoe scanning apparatus of FIG. 1.

A schematic representation of the shoe scanning apparatus 101 is shown in FIG. 2. A dielectric membrane 201 is in proximity to the support platform 102 and includes at least one input line. However, in the embodiment of FIG. 2, a first-input line 202 and a second input line 203 are examples of sixteen input lines connected to horizontal tracks on the underside of the dielectric membrane 201. Similarly, a first-output line 204 and a second-output line 205 are included in a total of sixteen output lines connected to output tracks on the upper side of the dielectric-membrane 201. In this way, a sixteen-times-sixteen (16×16) matrix of detector locations are defined.

An input multiplexer 206 receives a strobing voltage on a strobe-input line 207, generated by a strobing circuit 208. A processor 209 supplies an input address to the input multiplexer 206 via input-address lines 210. Thus, in this way, the input-strobing voltage 207 is sequentially supplied to each of the input lines, including the first-input line 202 and the second-input line 203, at line rate.

When a voltage is supplied to an input line, such as the first-input line 202, all of the output lines, including the first-output line 204 and the second-output line 205, are scanned sequentially; by an output multiplexer 211. To achieve this, the processor 209 provides addresses to the output multiplexer 211 via the output-address lines 212, at sample-rate.

An output-scan line 213 supplies the output voltages to the processor 209 via a buffer-amplifier 214. In this way, it is possible for the processor 209 to process scanned input voltages to produce output data to an external monitor, via an output interface 215. In an embodiment, the output interface 215 is a USB interface but could, for example, be a wireless interface.

In the embodiment of FIG. 2, the strobing circuit 208 includes a voltage-boosting circuit 216 that in turn provides voltage regulation. Thus, a supply voltage is supplied from a voltage-regulation circuit to the voltage-adjustment circuit 217. The voltage-adjustment circuit includes a comparator 218 that compares voltage control data on a voltage-control line 219 (received from the processor 209) against a reference voltage on a reference-voltage line 220.

In an embodiment, the voltage-boosting circuit 216 produces a voltage of more than one-hundred volts and may produce a voltage of up to one-hundred-and-fifty volts. The voltage-control line 219 produces a control voltage via a digital-to-analog convertor present within the processor 209. In an embodiment, the control voltage may be implemented from zero to one-hundred-and-fifty volts, over two-hundred-and-fifty-five increments.

FIG. 3

Figure 3:
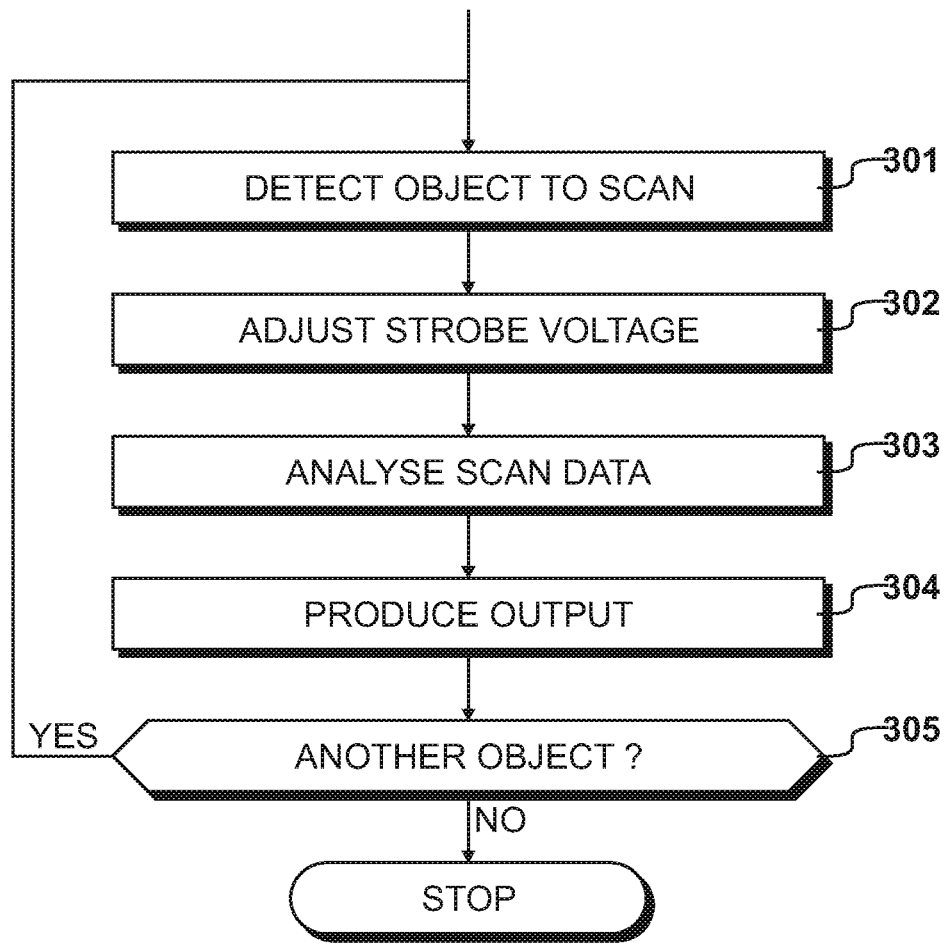
FIG. 3 shows procedures performed by a processor identified in FIG. 2.

Procedures performed by the processor 209 are identified in FIG. 3. At step 301, an object is detected and a new scanning cycle is initiated. Thus, for the shoe scanner of FIG. 1, a person will move off the scanner and for a period of time, no object will be present. Thereafter, the next person will stand on the scanner and a new scanning cycle will be initiated.

At step 302, the strobe voltage is adjusted to optimise a scanning operation. Thereafter, at step 303, the optimised scanned data is analysed and output data is then produced at step 304. A question is then asked at step 305 as to whether another object is to be scanned and when answered in the affirmative, the next object is detected at step 301.

In the embodiment of FIG. 3, step 302, of adjusting the strobe voltage, is performed exclusively under the control of the processor 209. In this embodiment, the processor 209 may be implemented as a standard microcontroller.

Subsequent analysis of scanned voltages is performed at step 303. Again, much of this analysis may be performed by the processor 209 but, with greater levels of analysing sophistication, a higher level of processing capability may be required. Alternatively, additional processing of output data may be performed by an external processing environment, as described with reference to FIG. 8.

FIG. 4

Figure 4:
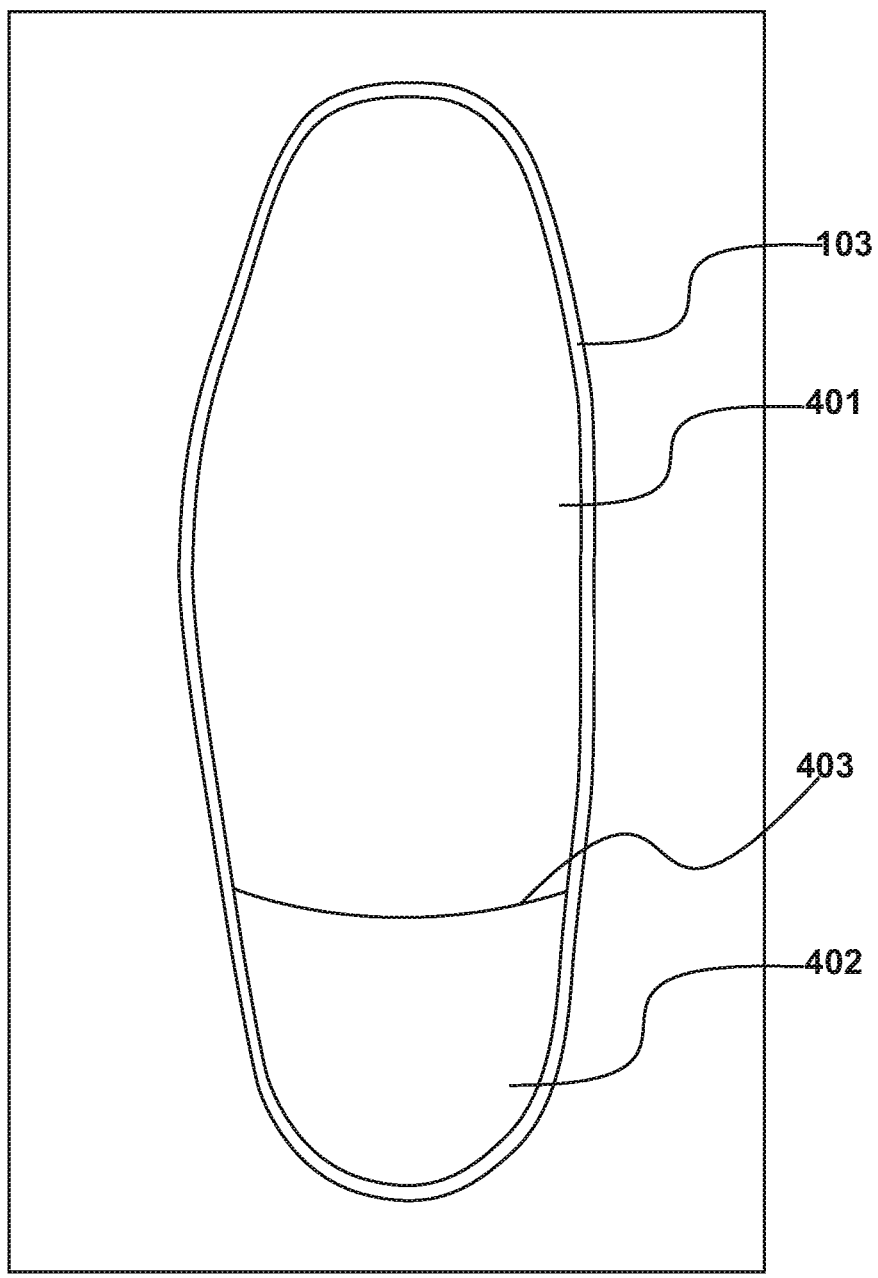
FIG. 4 shows how a shoe appears to the apparatus of FIG. 1.

As seen by the scanner described with reference to FIG. 1, a shoe placed on the support platform 102 appears substantially as shown in FIG. 4. Typically, a shoe 103 includes a sole portion 401 and a heel portion 402. In resulting image data, it is expected that a change 403 will occur between the sole portion 401 and the heel portion 402. However, if further changes are identified, this may suggest that something has been concealed within the shoe, such that an alarm condition should be raised and further investigations made.

FIG. 5

Figure 5:
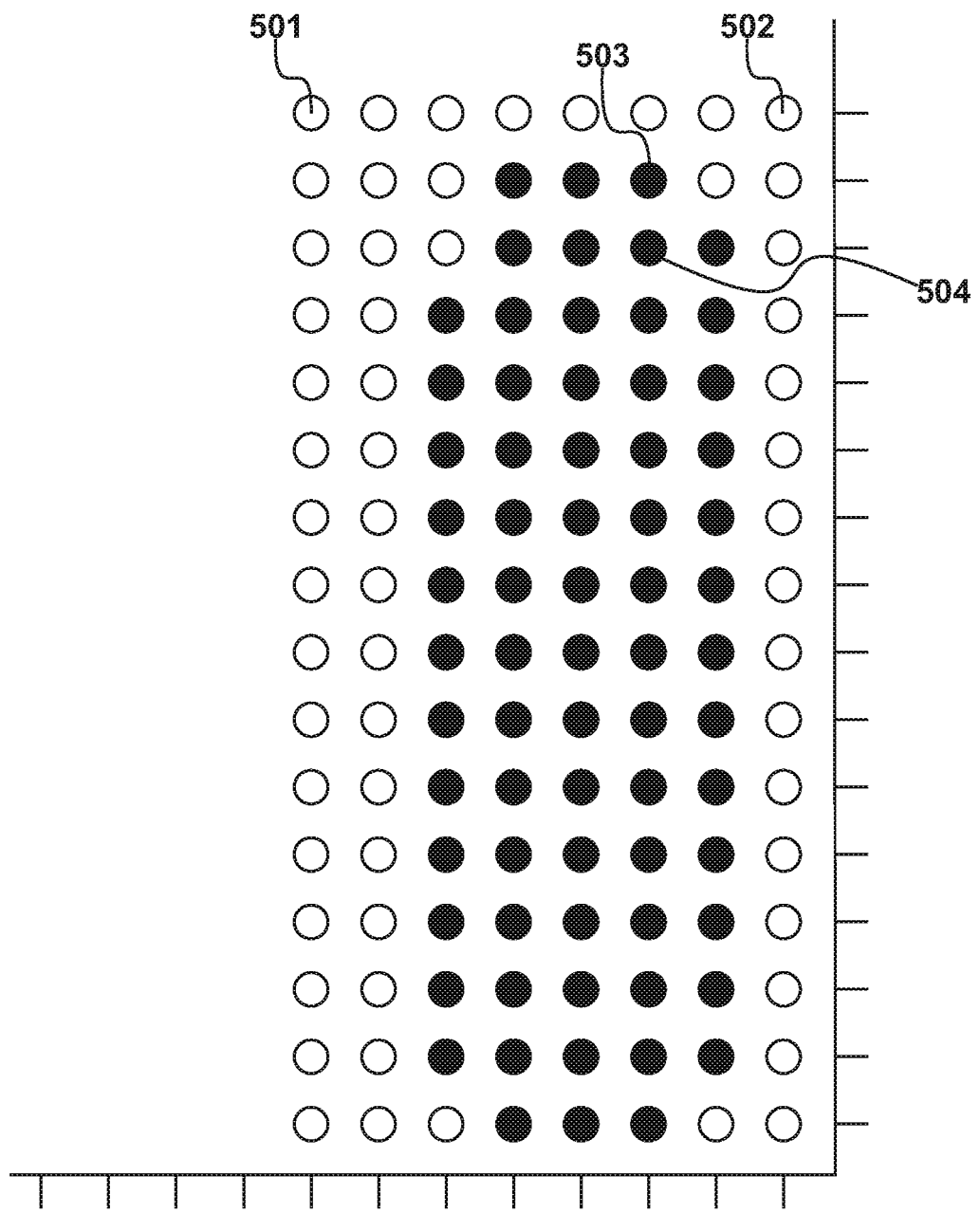
FIG. 5 illustrates data generated from a shoe scanning operation.

As a result of shoe 103 being placed on the support platform 102, in an orientation as illustrated in FIG. 4, output data is generated in a two-dimensional matrix, as illustrated in FIG. 5. In FIG. 5, matrix locations 501 and 502 are shown as unshaded circles, representing matrix locations where data has not been generated. Similarly, locations, such as location 503 and location 504, are at positions where part of the shoe 103 is present, resulting in data being generated. Thus, where data has been generated, a shaded circle is illustrated.

In FIG. 5, each shaded circle is equivalent and therefore this representation only shows a single bit for each position of contact. However, it should be appreciated that at each position of contact, an intensity value is generated that could, typically, be defined by twelve or sixteen bits, depending upon the capabilities of the processor 209. In this way, the intensity values have a dynamic range. The present invention seeks to ensure that the area of interest produces intensity values that attempt to optimise the use of this dynamic range.

FIG. 6

Figure 6:
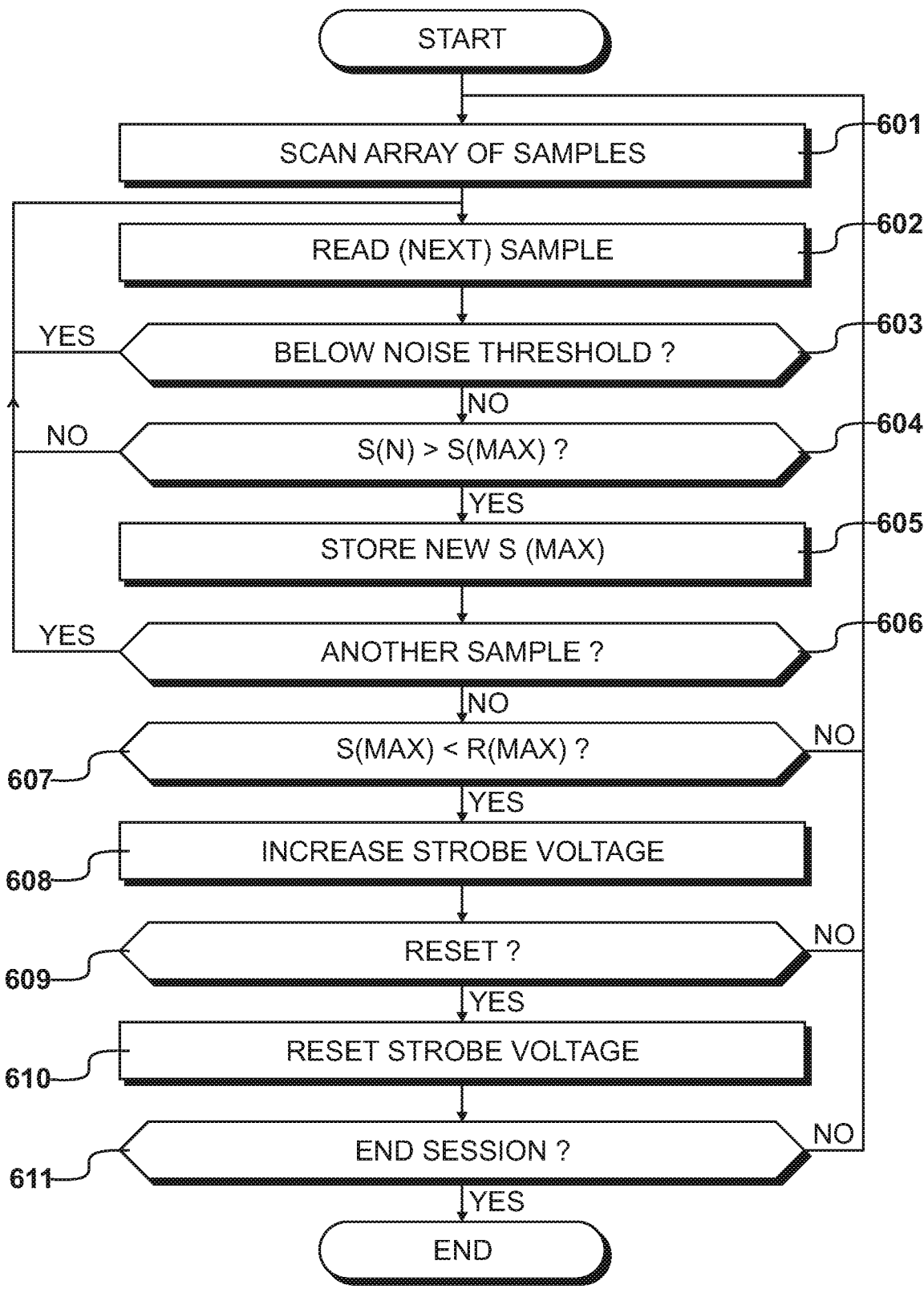
FIG. 6 shows procedures for voltage adjustment.

Procedures for voltage adjustment are illustrated in FIG. 6. In a first embodiment, these procedures are performed by internal processor 209. In an alternative embodiment, the procedures identified in FIG. 6 are performed by an external processing device, such as that described with reference to FIG. 8, and the internal processor 209 is only concerned with the multiplexing and strobing functions previously described. For the purpose of this description, it is assumed that the procedures detailed in FIG. 6 are performed by a microcontroller with sufficient processing capability.

At step 601, samples in an array are scanned by addressing the input multiplexer 206 at line-rate and addressing the output multiplexer 211 at sample rate. Individual samples are then returned to the processor 209 via the buffer amplifier 214. This results in the generation of an array of samples, as illustrated in FIG. 5.

At step 602, a sample is read and at step 603 a question is asked as to whether the sample is below a noise threshold. If the question asked at step 603 is answered in the affirmative, it is assumed that the sample value only represents noise and the next sample is then read at step 602. Such a sample would be of the type identified at 501, represented as an unshaded circle.

If the question asked at step 603 is answered in the negative, the sample is a sample of the type shown at 503 and would be a shaded circle.

The next stages of the process seek to identify a maximum sample value for the scan currently under consideration. At step 604 a question is asked as to whether the sample currently under consideration S(N) is larger than the maximum sample S(MAX) received so far. If this question is answered in the affirmative, the new value for the maximum sample is stored at step 605, thus S(N) replaces the previous S(MAX). Thereafter, a question is asked at step 606 as to whether another sample is to be considered. When answered in the affirmative, the next sample is read at step 602.

Eventually all of the samples will have been considered, therefore the variable S(MAX) will represent the highest-value sample received for the scan. A question is then asked at step 607 as to whether S(MAX) is smaller than a reference value identified as R(MAX). If this question is answered in the affirmative, the strobe voltage is increased at step 608.

A question is then asked at step 609 as to whether a reset condition has been identified and if answered in the negative, a further iteration is performed, by scanning an array of samples at step 601 with the increased strobe voltage specified by step 608. Thus, while an object remains on the scanner, steps 601 to 608 are repeated and the input strobe voltage is increased until a maximum sample value reaches the maximum reference value R(MAX).

When an object leaves the scanner, the question asked at step 609 is answered in the affirmative and the strobe voltage is reset at step 610. Thereafter, at step 611, a question is asked as to whether the session is to end, which when answered in the negative, returns control to step 601; such that the next array of samples may be scanned for the next received shoe.

In this embodiment, it is assumed that the starting voltage is always relatively low, possibly at something like twenty-five percent of the maximum. Consequently, it is unlikely that a voltage reduction will be required but an increase in voltage may be required. In alternative embodiments, the voltage may start at a mid-position and optimisation may involve reducing the voltage or increasing it.

The procedures of FIG. 6 attempt to optimise use of the available dynamic range, thereby facilitating the subsequent processing of the scanned data. In this example, a maximum value is identified and the procedure seeks to ensure that this maximum value is close to a maximum possible value, thereby making use of the available dynamic range. However, it will be appreciated that other approaches could be adopted, possibly with the inclusion of various offsets and scaling functions. Within this environment, trade-offs exist in terms of clock speeds, available processing capability and the duration over which the object remains in position. The aim is to create a situation in which a sufficient number of iterations are performed to obtain scan values that are sufficiently accurate to allow an analysis to be performed to identify suspicious objects.

In an embodiment, as described with reference to FIG. 6, the processor 209 has performed a plurality of scanning iterations in order to optimise a strobing voltage and produce an optimised array of scanned voltage values. This single optimised array of data is transmitted to an external processing device via the USB interface 215.

FIG. 7

Figure 7:
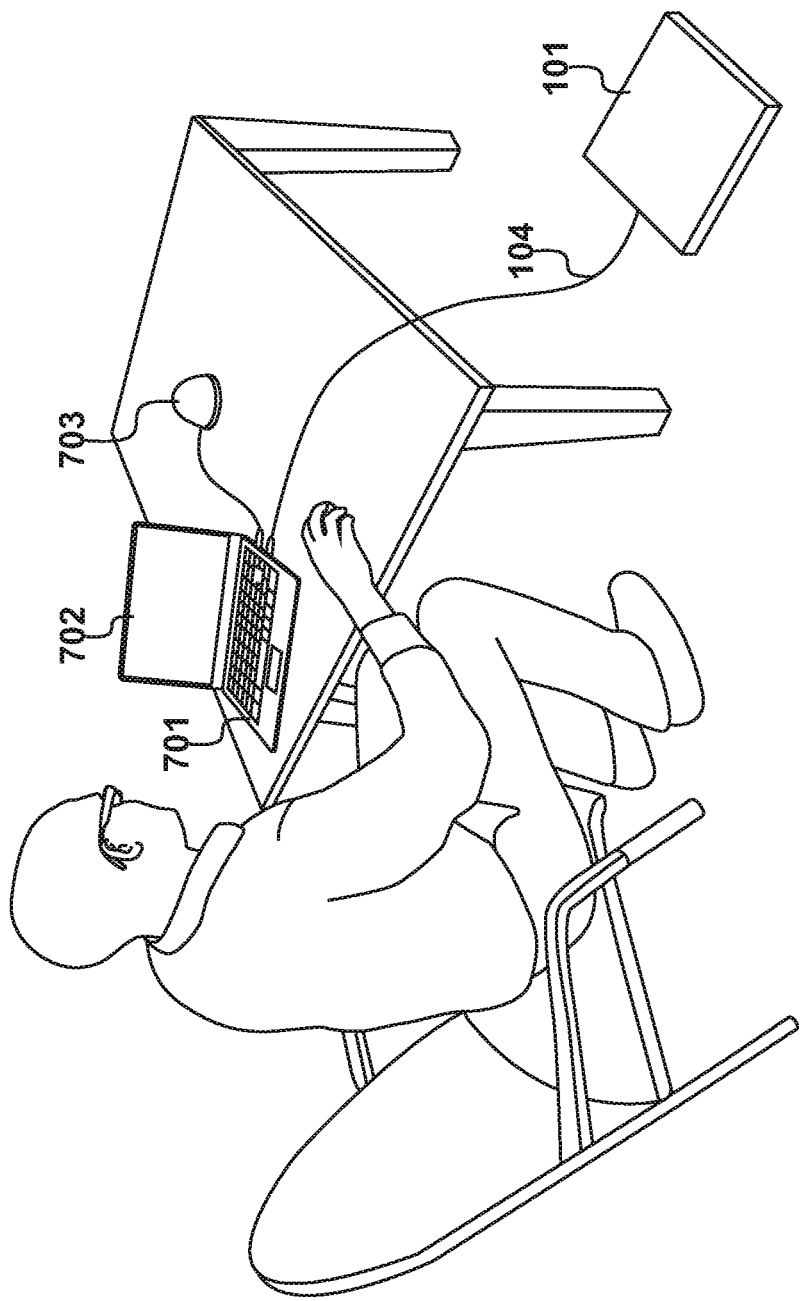
FIG. 7 shows the shoe scanning apparatus of FIG. 1 communicating with an external processing device.

As illustrated in FIG. 7, output data line 104 connects the shoe scanning apparatus 101 to an external-processing device 701. The external-processing device 701 includes a visual display monitor 702, allowing output data from the matrix of sensors to be displayed as three-dimensional images, as described with reference to FIG. 8. Furthermore, the external processing device 701 analyses each array of received data to identify unusual conditions that require further investigation. To prompt an investigation of this type, the external processing device 701 is also configured to energise an alarm-device 703.

FIG. 8

Figure 8:
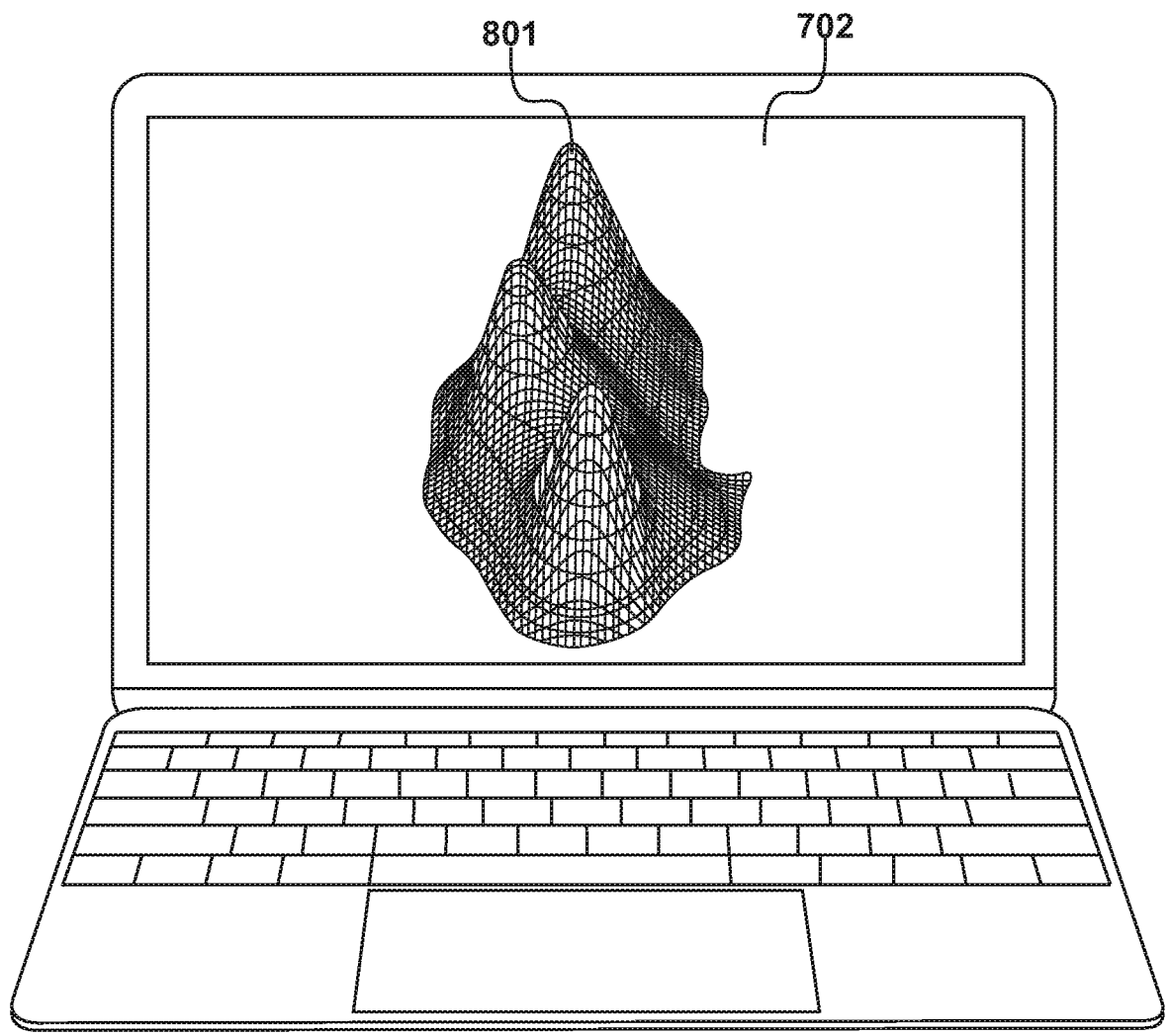
FIG. 8 shows an example of a three-dimensional projection of an array of data displayed on a visual-display-monitor identified in FIG. 7.

An example of a three-dimensional projection 801 of array data displayed on the visual-display-monitor 702 is illustrated in FIG. 8. The image 801 shows a plane of the array, as described with reference to FIG. 5, projected within a displayed three-dimension space, such that intensity values may be displayed with respect to a third dimension. In this way, intensity values may be shown to an operative in response to each shoe being located on the scanner. Thus, following a degree of training, an operative is in a position to identify suspect shoes and take appropriate action.

In an embodiment, automated procedures are also present to perform an automated analysis, as described with reference to FIGS. 9 to 12, such that when a suspect condition is identified, the alarm-device 703 may be energised. Thus, in an embodiment, it may only be necessary for an operative to view an image in response to an alarm being raised. Possibly, an operative could work with many scanning stations, taking appropriate action when any one of these scanning stations identifies a potentially problematic situation.

FIG. 9

Figure 9:
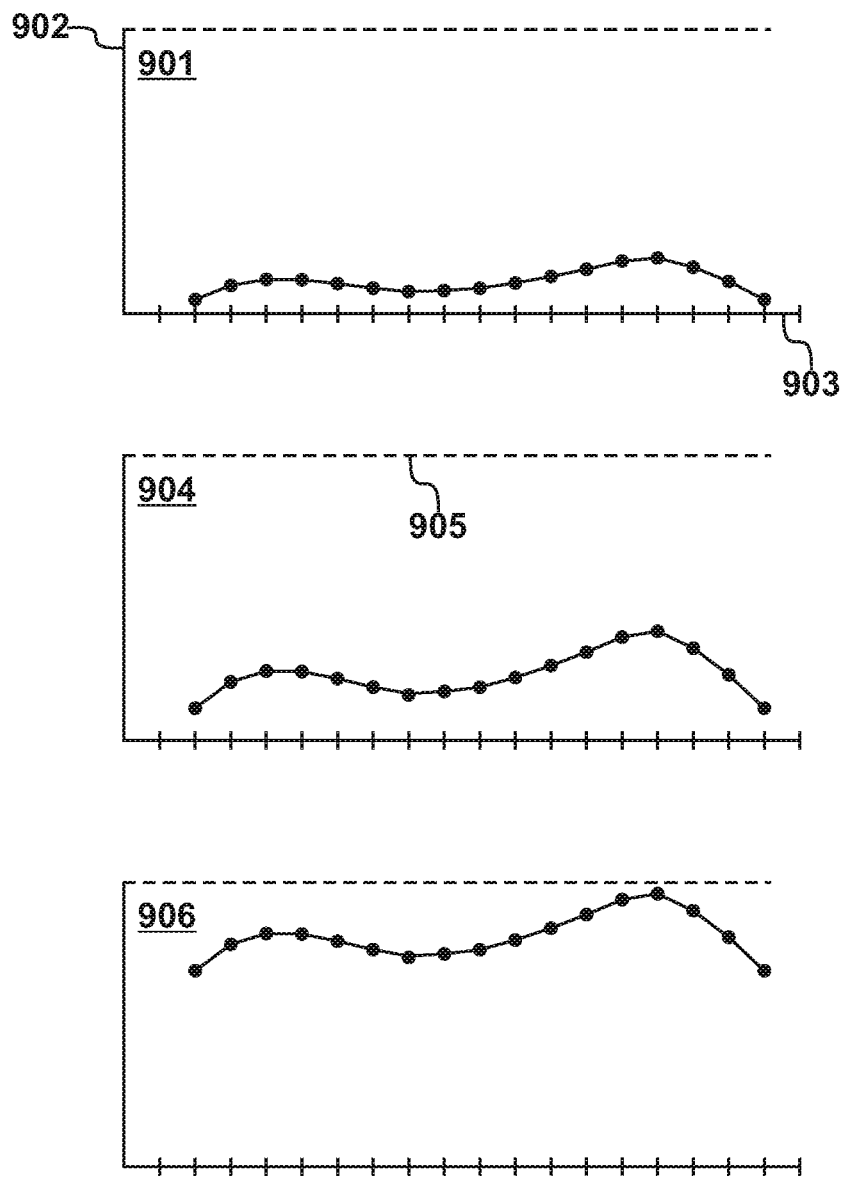
FIG. 9 shows examples of scanning data.
Figure 10:
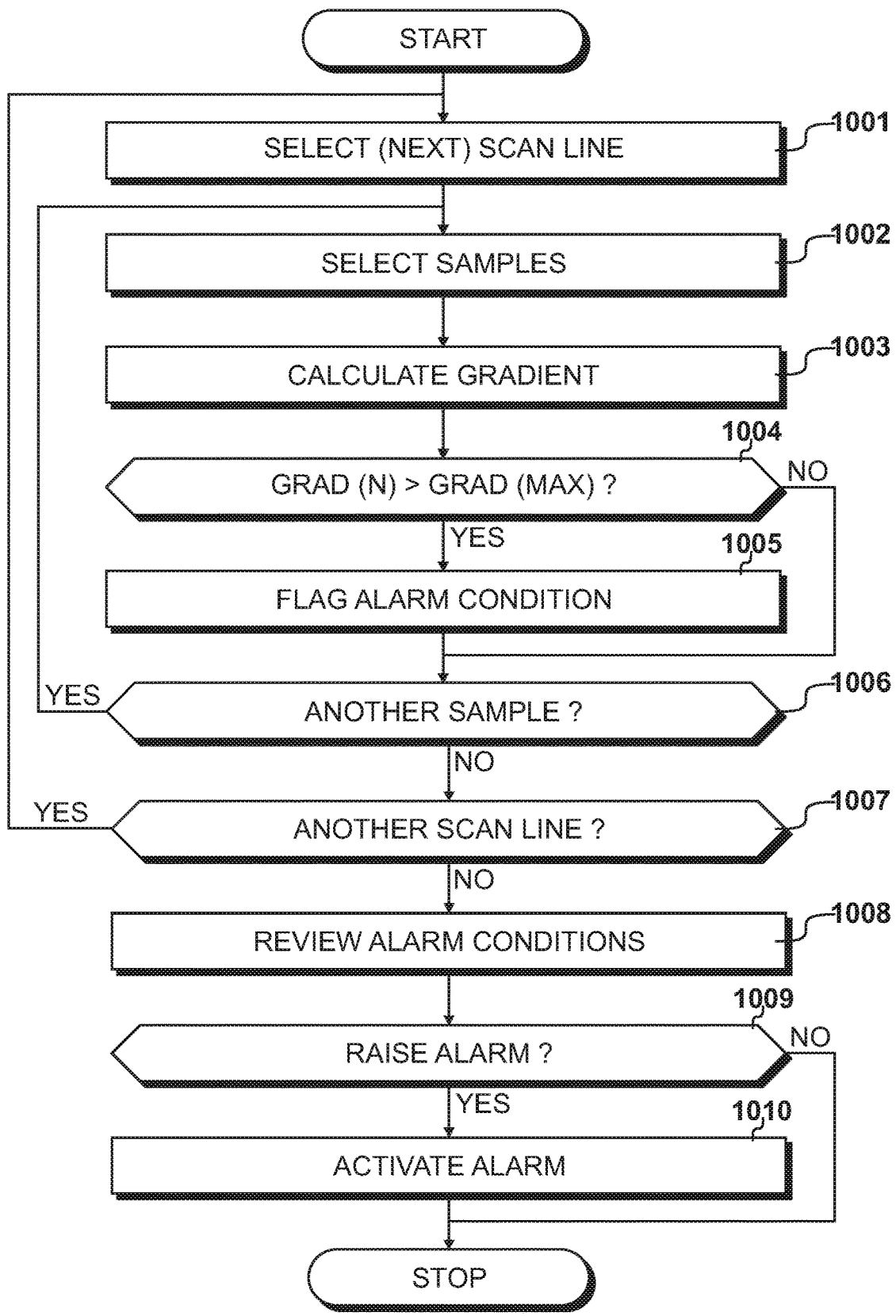
FIG. 10 shows procedures performed by an external processing device.

Examples of scanning data generated in response to scanning the shoe illustrated in FIG. 4, are shown in FIG. 9. In FIG. 9, a first graph 901 shows output scanning voltage 902 plotted against sample position for a first applied strobing voltage. At 904, a similar plot is shown with an increased strobing voltage. In addition, a maximum value is indicated by line 905, indicating that the output values are still well below a threshold value, thereby inviting a further increase in the applied input strobing voltage.

Results for a higher input strobing voltage are illustrated by a third graph 906 and, in an embodiment, this two-dimensional scan line of data would be included in an array of data conveyed from the processor 209 to the external processing device 701.

In this example, the highest voltages of the scan line start to approach a maximum reference value, therefore the input strobing voltage has been optimised by the procedure.

FIG. 10

In an embodiment, the external-processing device 701 considers individual scan lines of data, of the type shown in FIG. 9 and, in particular, considers abrupt changes in these values. In this embodiment, gradient values are considered by comparing adjacent sample points. However, it should be appreciated that more sophisticated techniques may be deployed for gradient assessment, such as techniques using polynomial approximations.

In an embodiment, an array consists of sixteen positions along each of sixteen scan lines. Thus, when processing the data, sixteen scan lines are present of the type illustrated by graph 906.

At step 1001, a scan line is selected which, for the purposes of illustration, may be the scan line shown by graph 906. At step 1002, samples are selected which, in an embodiment, may include the first point of the scan line and the second point of the scan line. At step 1003, a gradient value is calculated and at step 1004, a question is asked as to whether the calculated gradient is larger than a maximum reference value, identified as GRAD(MAX).

If the question asked at step 1004 is answered in the affirmative, this sudden increase in gradient is identified as a potential alarm condition, that is flagged at step 1005. In an embodiment, the detection of a single alarm condition may in turn result in the generation of an alarm signal. However, in alternative embodiments, it may be necessary for a plurality of alarm conditions to be flagged before an actual alarm signal is generated.

At step 1006, a question is asked as to whether another sample is present and when answered in the affirmative, samples are again selected at step 1002. Thus, on a first-iteration, sample N and sample N+1 may be selected to allow a gradient to be calculated at step 1003. The question then asked at step 1006 is answered in the affirmative, because sample N+2 has not been considered. Thus, at step 1002, sample N+1 and sample N+2 are considered again, to calculate a gradient. Thus, this process continues until all of the samples have been considered and the question asked at step 1006 is answered in the negative.

At step 1007, a question is asked as to whether another scan line is present, representing another line in the two-dimensional array. When answered in the affirmative, the next scan line is selected at step 1001 and the process is repeated for the samples present on that scan line. Thus, all of the samples of all of the scan lines are considered, whereafter the question asked at step 1007 will be answered in the negative.

During these iterations, alarm conditions will have been flagged at step 1006. These alarm conditions are reviewed at step 1008. Thus, for example, a single alarm condition may be treated as an error due to noise. However, if the number of alarm conditions identified exceeds the predetermined threshold, an alarm condition is raised. Thus, a question is asked at step 1009 as to whether the alarm should be raised and when answered in the affirmative, the alarm is activated at step 1010. Alternatively, if the question asked at step 1009 is answered in the negative, the alarm is not activated and the process terminates, awaiting the next array of optimised scanned data.

FIG. 11

Figure 11:
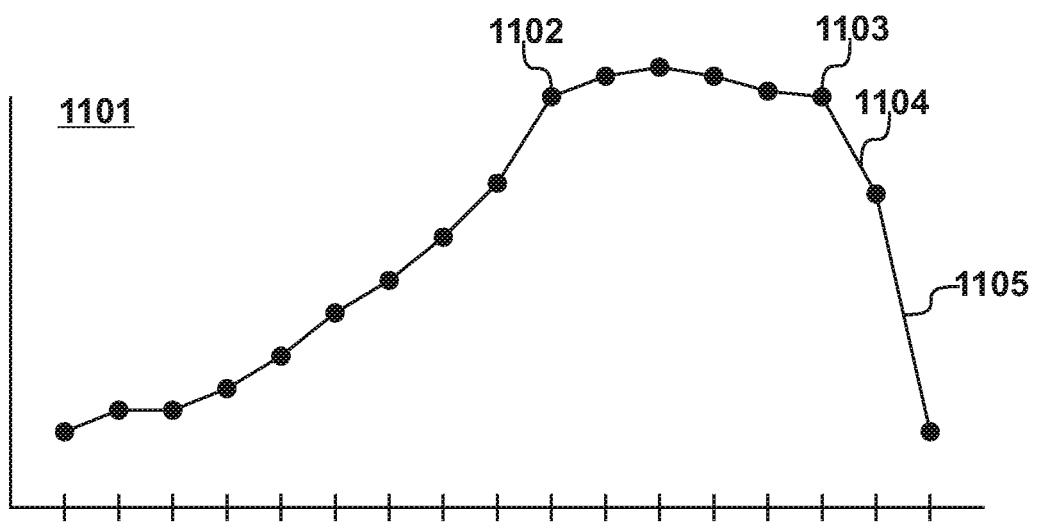
FIG. 11 shows a graph of values produced when further discontinuities are present.

A graph 1101 is shown in FIG. 11, representing output samples, after strobing voltage optimisation, and is therefore similar to graph 906.

Peak sample values are shown at 1102 and 1103. The gradient of slope 1103 and the gradient of slope 1104 are identified at step 1004 as being larger than a predetermined maximum. Thus, as a result of this, many alarm conditions will be flagged at step 1005 and it is likely that the alarm will be activated at step 1010.

FIG. 12

Figure 12:
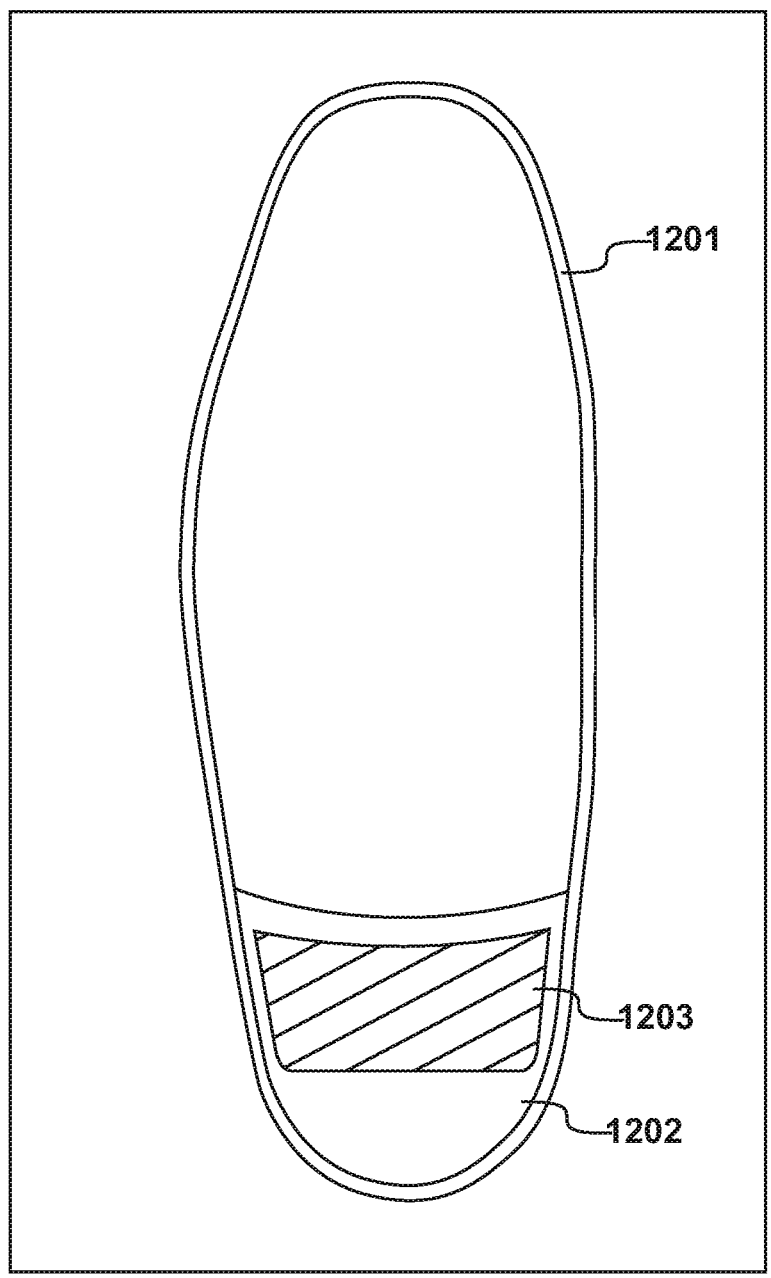
FIG. 12 illustrates an image of a shoe responsible for the generation of the data illustrated in FIG. 11.

A shoe, as seen by the scanner and responsible for the sample points shown in FIG. 11, is illustrated in FIG. 12. The image is substantially similar to that shown in FIG. 4 and is derived from a shoe with a sole portion 1201 and a heel portion 1202. However, further investigation shows that the unusual response illustrated in FIG. 11, resulting in the generation of an alarm signal, was due to the presence of concealed material 1203 within the heel 1202.

The invention claimed is:

1. A method of scanning shoes with an external electric field, comprising the steps of:
  positioning a shoe while being worn, upon a support platform;
  strobing at least one input line by application of an input voltage having a first intensity;
  sampling a plurality of output lines to produce a plurality of output samples;
  comparing a selected output sample of said plurality of output samples against a reference; and
  adjusting said input voltage in response to said comparing step from said first intensity to a second intensity.

2. The method of claim 1, wherein said second intensity is larger than said first intensity.

3. The method of claim 1, wherein:
  said at least one input line and said plurality of output lines are restrained upon a planar membrane beneath said support platform;
  said external electric field extends from said planar membrane;
  said external electric field returns to said planar membrane; and said external electric field has a field strength that varies with respect to a permittivity of said shoe located above said planar membrane by said support platform.

4. The method of claim 1, further comprising the step of strobing a plurality of input lines, in addition to said at least one input line.

5. The method of claim 4, wherein said plurality of output samples represent properties in a two-dimensional array.

6. The method of claim 5, wherein said plurality of output samples are shown in a three-dimensional representation.

7. The method of claim 5, wherein output data is selected based on a maximum sample value of an output sample of said two-dimensional array.

8. The method of claim 7, wherein said reference represents a maximum possible value; and
said adjusting step adjusts said input voltage to place said maximum sample value substantially at said maximum possible value.

9. The method of claim 8, further comprising the step of calculating a rate-of-change between said plurality of output samples.

10. The method of claim 9, further comprising the step of selectively raising an alarm signal based on an outcome of said calculating step.

11. An apparatus for scanning shoes, comprising:
a support platform for supporting a person wearing at least one shoe, such that said at least one shoe is in contact with said support platform;
a dielectric membrane in proximity to said support platform, including at least one input line and a plurality of output lines;
a strobing circuit for applying input voltages to said at least one input line;
a sampling circuit for receiving output voltages from said plurality of output lines;
a processor for comparing a selected output signals against a reference to produce voltage-control data; and
a voltage-adjustment circuit for adjusting said input voltages from a first intensity to a second intensity in response to said voltage-control data.

12. The apparatus of claim 11, including a plurality of input lines, such that said plurality of input lines and said plurality of output lines define a matrix.

13. The apparatus of claim 12, wherein said matrix is supported by said dielectric membrane.

14. The apparatus of claim 13, further comprising a visual display monitor, wherein output data from said matrix is displayed as three-dimensional images on said visual display monitor.

15. The apparatus of claim 11, wherein said reference represents a maximum-intensity value and said processor is configured to:
adjust said input voltages to place a maximum output signal substantially at said maximum-intensity value;
calculate a rate-of-change between output signals; and
selectively raise an alarm signal based on an outcome of said calculating step by energizing an alarm device.

16. The apparatus of claim 11, wherein said voltage-adjustment circuit includes a comparator for comparing said voltage-control data against a voltage reference.

17. The apparatus of claim 16, wherein said comparator receives a supply voltage from a voltage-regulation circuit.

18. The apparatus of claim 17, wherein said voltage-regulation circuit includes a voltage-boosting circuit.

19. The apparatus of claim 18, wherein said voltage-boosting circuit produces an output voltage of more than one-hundred volts.

20. The apparatus of claim 19, wherein said voltage-boosting circuit produces an output voltage of one-hundred and fifty volts.

* * * * *